United States Patent
Hansen et al.

(10) Patent No.: US 6,697,913 B1
(45) Date of Patent: Feb. 24, 2004

(54) SEEK QUEUE FOR IMPROVED DISK DRIVE PERFORMANCE

(75) Inventors: Fred Hansen, Newark, CA (US); Kerry Mellor, San Jose, CA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/280,416

(22) Filed: Mar. 29, 1999

(51) Int. Cl.⁷ .............................................. G06F 12/00
(52) U.S. Cl. ............................. 711/112; 711/100; 711/4
(58) Field of Search ........................ 711/111, 112, 113, 711/114, 100, 4, 147; 360/75

(56) References Cited

U.S. PATENT DOCUMENTS

| | | | | |
|---|---|---|---|---|
| 5,644,786 A | * | 7/1997 | Gallagher et al. | 710/30 |
| 5,664,143 A | * | 9/1997 | Olbrich | 711/112 |
| 6,108,750 A | * | 8/2000 | Yamamoto et al. | 711/112 |
| 6,141,707 A | * | 10/2000 | Halligan et al. | 710/36 |
| 6,170,042 B1 | * | 1/2001 | Gaertner et al. | 711/158 |

* cited by examiner

Primary Examiner—Donald Sparks
Assistant Examiner—Brian R. Peugh
(74) Attorney, Agent, or Firm—David M. Sigmond

(57) ABSTRACT

A method for improving disk drive performance by reducing the overhead associated with the command processing code requesting a seek. As multiple commands are queued up in a command queue, a next command is identified and immediately stored in a servo position queue, as soon as the next command location is determined. Therefore, as the drive electronics are prepared for read and write operations, the servo system initiates the actuator to move the read/write head to the next command location. By the time the read/write head arrives at the next command location, the drive electronics are ready for the read/write operation. As a subsequent command is determined, its location is again entered into the position queue, overwriting the previous command location.

40 Claims, 4 Drawing Sheets

SEEK QUEUE FOR IMPROVED DISK DRIVE PERFORMANCE

FIELD OF THE INVENTION

The present invention relates generally to methods for use in disk drives for computer systems. More particularly, the present invention relates to methods for improving disk drive performance by using a seek queue that the command processing code can fill as soon as the next command for processing is determined.

BACKGROUND OF THE INVENTION

Disk drives are widely used in computer and data processing systems for storing information in digital form. Typically, a disk drive includes at least one disk that spins about a spindle and is driven by a spindle motor. Information is accessed and written to by data transducers. As the disks spin, a cushion of air is created between each disk surface and its corresponding transducer such that the transducer "flies" slightly above the disk surface. This enables an actuator assembly to position the transducers back and forth between concentric tracks defined on each disk surface. Each track typically includes a plurality of data sectors and servo sectors. Servo sectors provide servo information, identifying the location associated with specific data sectors. A "servo system" typically refers to the in-drive system that processes servo information and communicates the location of the transducer to the drive controller.

When a disk drive receives a command from a host system, the actuator assembly must position the transducer to the data sector where the command data is located. This process is referred to as a "seek", which encompasses activities associated with positioning the heads to a predetermined location on the disk drive medium to initiate data recording and data retrieval sequences. A seek is initiated by a "seek request", which is made by the drive after the preceding seek is completed and the location of a next host command has been determined.

When a disk drive receives multiple commands from a host system, the drive must determine an order for processing the commands that provides maximum performance and highest efficiency. One method used to increase the I/O performance of disk drives is establishing a command queue between the host and the disk drive. Typically, the host maintains enough active commands to keep the queue full. As one command is completed, the host replaces it with another. The drive is then allowed to process the commands and to reorder the commands in the queue in an order that provides maximum performance. By using knowledge of the physical location of information on the drive and the drive's seek performance, there are known methods that sort the command queue in such a way as to minimize the time spent re-positioning the heads, thus maximizing the number of commands processed in a given time.

However, command queue depths have gotten so deep while the methods of reordering the command queue have become so efficient that the time required for requesting a seek now takes up a significant percentage of command processing time.

Therefore, there exists a need for a method of processing commands that eliminates the excessive overhead required in requesting a new seek.

SUMMARY OF THE INVENTION

The present invention satisfies this need.

In accordance with the present invention, a seek request is initiated as soon as a command processing code determines the location of a next command from the command queue. The location of the next command is stored in a position queue in a servo block. Once the previous read or write command has finished and if the next command is sent to the position queue, the servo can initiate the read/write head to move towards that location. Concurrently, the drive processes background functions associated with preparing the drive for read and write operations so that by the time the read/write head arrives at the command location, the background functions will have already been completed, thus eliminating seek request overhead.

These and other advantages of the present invention will become apparent upon reading the following detailed description and studying the various figures of the drawings.

BRIEF DESCRIPTION OF THE DRAWINGS

The invention may best be understood by reference to the following description taken in conjunction with the accompanying drawings in which:

FIG. 1b is a schematic representation of electrical components of the disk drive of FIG. 1a.

DETAILED DESCRIPTION OF THE EMBODIMENTS

The present invention will now be described in detail with reference to a few preferred embodiments thereof as illustrated in the accompanying drawings. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

Figure 1A:
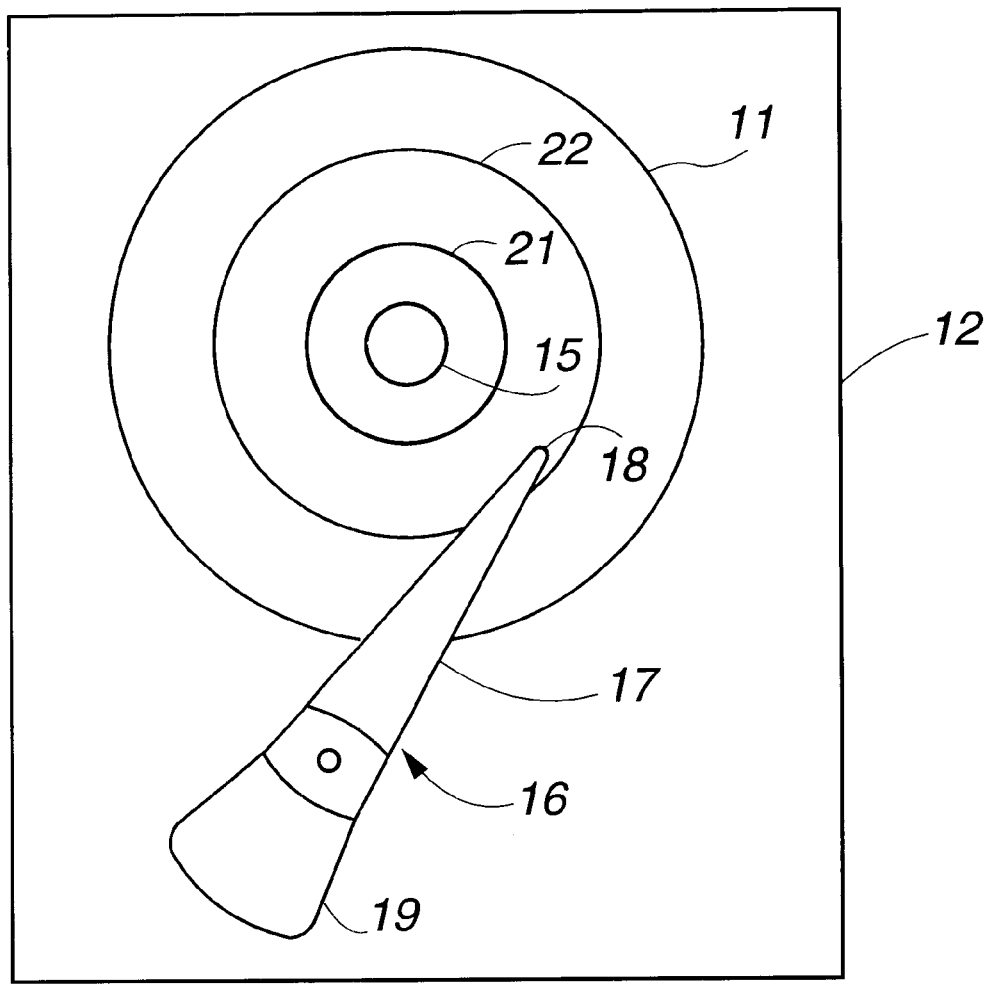
FIG. 1a is a schematic representation of a disk drive assembly.

Referring initially to FIG. 1a, a disk drive 10 according to the present invention includes a drive housing 12, a plurality of spaced apart rotating storage disks 11, an actuator assembly 16 including a plurality of suspension arms 17 and a read/write transducer head 18 suspended from the distal end of each suspension arm 17. The disks 11 are driven by a motor (not shown), typically a brushless D.C. motor, about spindle 15. The actuator assembly 16 is typically driven by a voice coil motor 19 to rotate between a fixed radial displacement so that the read/write heads 18 may be positioned at concentric data tracks (e.g. tracks 21 and 22) of each disk 11. The drive housing 12 is typically installed in the case of a computer (not shown) or a word processor (not shown).

Figure 1B:
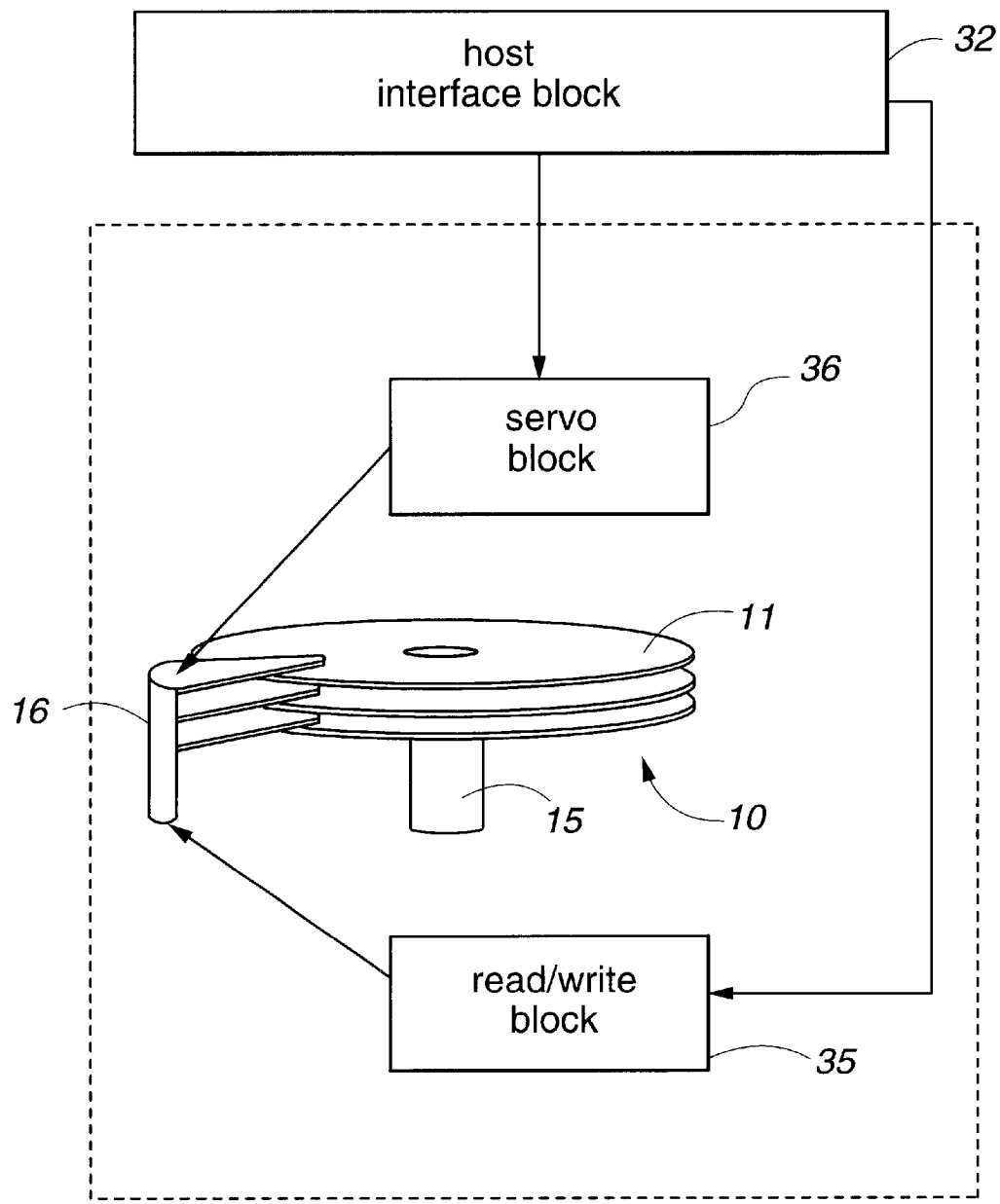

FIG. 1b is a simplified schematic representation of electrical components of disk drive 10, including a host interface block 32, read/write block 35 and servo block 36. The host interface block 32 represents both circuits and computer code. The host interface block 32 is responsible for accepting commands from the host, maintaining and sorting those commands, passing new commands to the read/write block 35, accepting completed commands back from the read/write block and finally notifying the host when commands are complete.

Read/write block 35 represents a series of circuits that stand between a disk drive controller and the read/write head. Read/write block 35 includes both circuits and computer code. The computer code portion of read/write block 35 (1) is responsible for and accepts commands from the host interface block 32, (2) notifies the servo block 36 of the position needed for the new command, (3) sets up the circuitry and the read/write data from a disk, and (4) notifies the host interface block 32 when the data transfer is completed. The circuit portion of the read/write block 35 includes byte counters, filtering circuits, and coders/decoders which condition the data and signals to ensure maximum data integrity. The setting of these circuits, by the code portion of the read/write block 35, must be re-set for each read/write operation.

Servo block 36 provides the means necessary for the actuator assembly to move the read/write transducer in the radial direction of the disk, to a desired track. The servo block 36 includes servo information recorded at dedicated servo sectors of the disk. Servo information provides feedback about the location of tracks, index marks, etc. and is compared to like information of the associated requested track.

Figure 2:
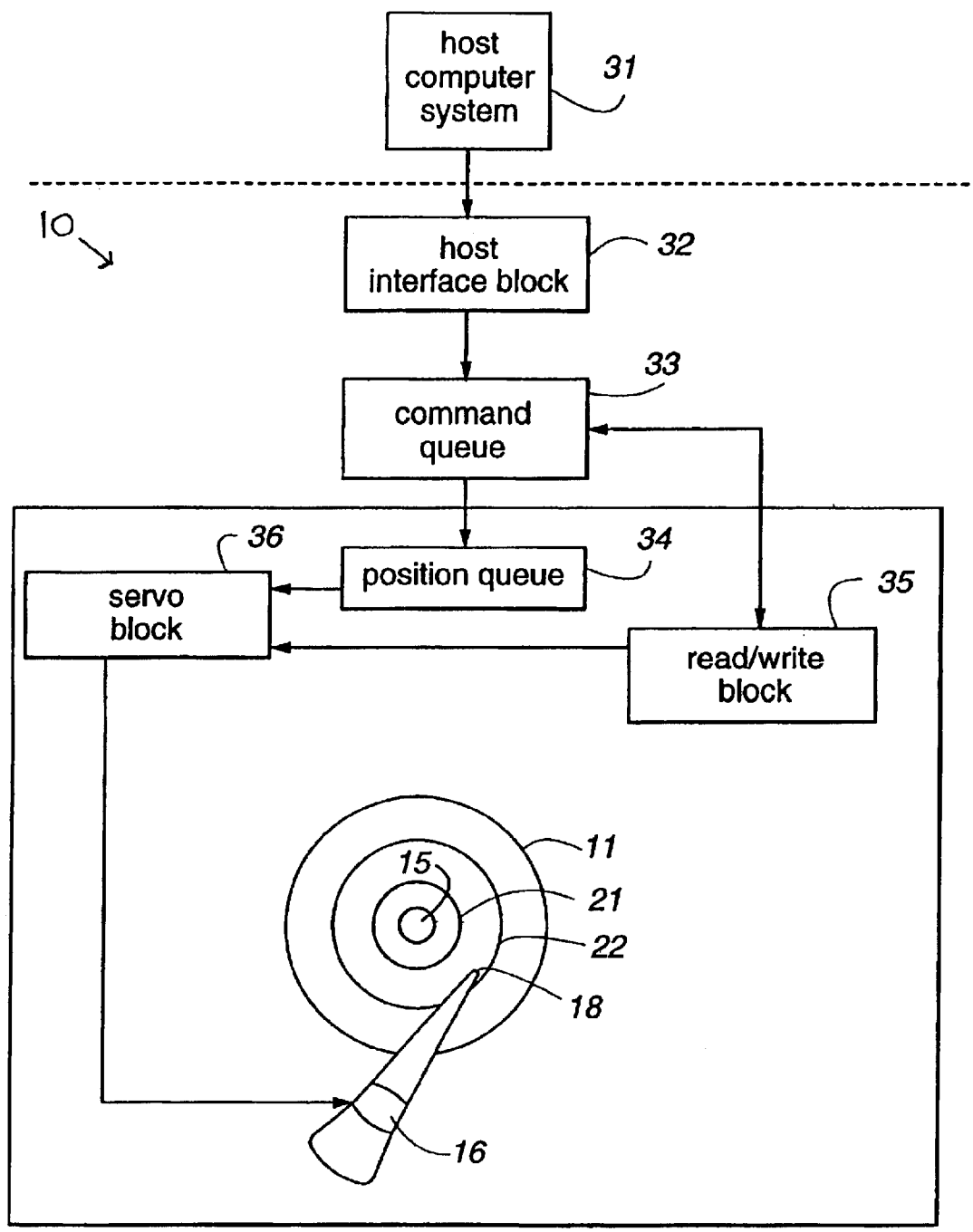
FIG. 2 is schematic representation of a disk drive assembly in accordance with the present invention.

Referring to FIG. 2, a typical method of increasing I/O performance is to establish a command queue 33 in the drive. The command queue 33 is coupled to the host interface block 32 wherein a command queue processing code determines a command order that provides maximum performance. When the command processing code determines a command to process from the command queue 33, it waits for the read/write block to return the last command as completed. The command processing code then passes the next command to the read/write block 35 for processing. Next, the read/write block 35 extracts position information from the command, then requests the servo block 36 to begin moving to that location. Finally, the servo block 36 sets the actuator assembly in motion towards the location of that command.

As the seek request is made, the read/write block 35 also indicates to the command processing code to start identifying the subsequent command. The sequence is then repeated as each subsequent command is identified. As mentioned previously, the overhead associated with the read/write block returning a completed status on the last command, then accepting a new command and finally sending a seek request has become a relatively significant portion of the overall command processing time e.g. often as high as 10%.

In accordance with the present invention, the seek request overhead is reduced, thereby improving overall drive performance. As represented in FIG. 2, a one-deep position queue 34 couples the servo block 36 and command queue 33. The position queue 34 is filled as soon as the next command is determined so that the read/write head 18 may traverse to the next command while read/write block 35 and host interface block 32 are exchanging command complete and new command information. The reduction of seek request overhead is realized by the actuator assembly 16 taking more time to move the read/write head 18 to the location of the next command than the read/write block 35 to perform background functions. Thus, when the read/write head 18 reaches its target location, the subsequent command will already have been determined. When the servo block 36 indicates that the read/write head has arrived at the target location, the location of the subsequent command is entered into the position queue 34, overwriting the previous command location. Once the data has been transferred to and from the disk at that location, the servo block 36 can immediately begin to act again. It should be noted again that as each subsequent command is determined from the command queue 33, the host 31 supplies additional commands so that the command queue 33 remains full at all times.

Figure 3:
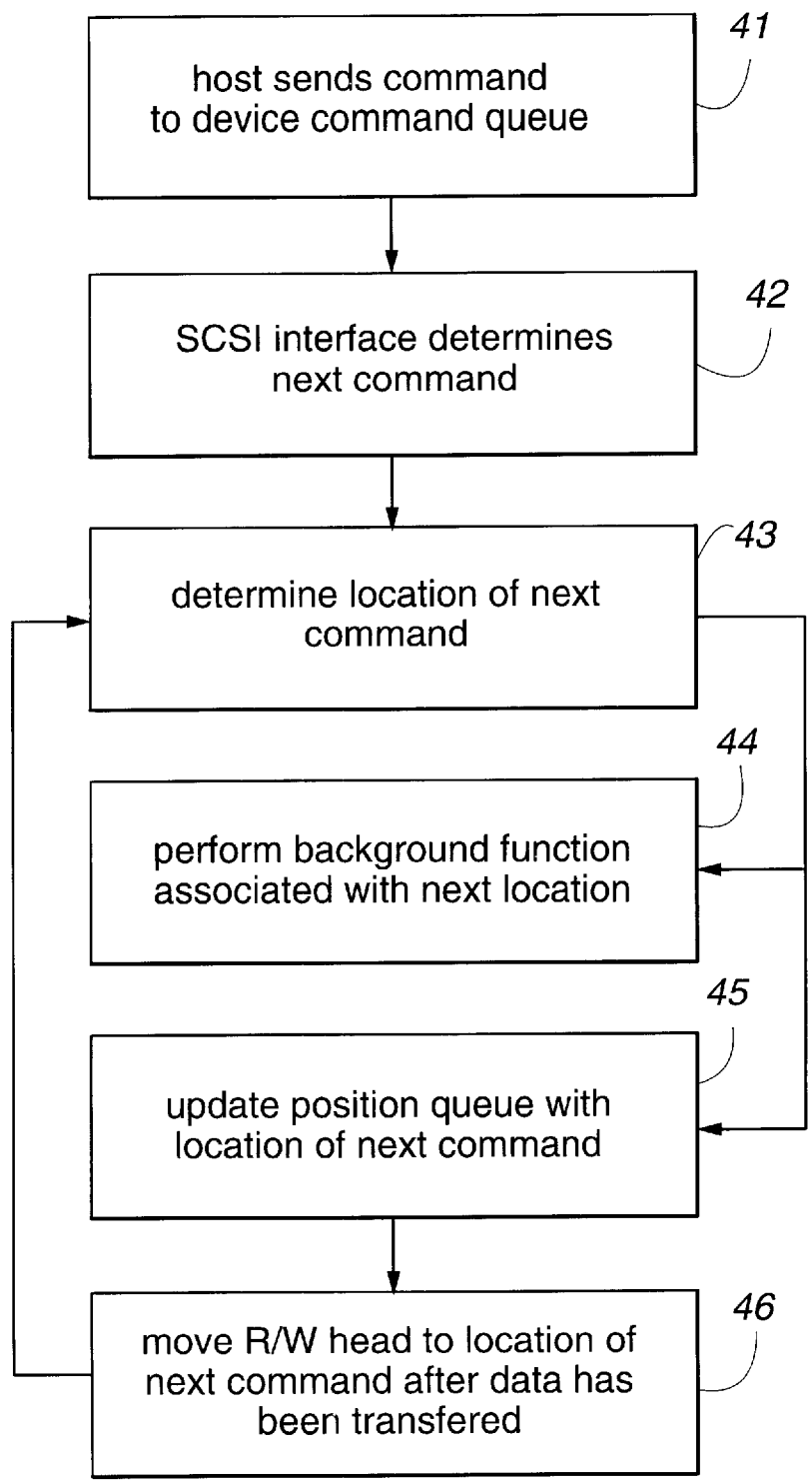
FIG. 3 is s flow diagram representation of the present invention.

FIG. 3 illustrates a step by step representation of the present invention. First, the host sends commands to the device (e.g. disk drive), which enters the commands into the command queue in step 41. Next, the host interface block 32 (e.g. SCSI interface) determines the next command to process in step 42. After determining the location of the next command in step 43, the read/write block 35 initiates the preparation of device electronics for a read/write operation in step 44. Concurrently, the position queue is updated with the next command location in step 45. Once the data has been transferred to/from the disk, the servo block 36 immediately begins moving the actuator assembly 16 to the new location while the read/write block 35 and command queue 33 exchange command status and information in step 46.

The present invention has been described as a disk drive application having a SCSI interface. However, it should be understood that the present invention may find utility in other interfaces, e.g. AT, fibre channel and other interfaces utilizing multiple command processing. In addition the present invention may also find utility in data storage devices such as an optical and magneto-optical storage devices.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. In a disk drive wherein read and write commands are accessed by a read/write head, a method of processing the commands comprising:

the disk drive receiving commands from a host computer system;

the disk drive storing the commands in a command queue;

the disk drive determining a next command in the command queue to process;

the disk drive determining a location associated with the next command; and the disk drive positioning a read/write head to the location of the next command while determining a subsequent command in the command queue to process following the next command.

2. The method of claim 1, further comprising:

establishing a one-deep position queue to store the location associated with the next command; and updating the position queue after each next command is determined.

3. The method of claim 1, wherein the subsequent command following the next command is determined before completion of positioning the read/write head to the location associated with the next command.

4. The method of claim 1, wherein the disk drive is a magnetic disk drive.

5. The method of claim 1, wherein the disk drive is an optical storage device.

6. A method of processing commands in a disk drive, comprising:
- the disk drive receiving commands from a host computer system;
- the disk drive storing the commands in a command queue;
- the disk drive determining a next command to process from the command queue;
- the disk drive storing a location associated with the next command in a one-deep position queue before a previous command is completed; and
- the disk drive performing a seek operation in response to the location stored in the position queue.

7. The method of claim 6, wherein determining the next command includes reordering the command queue.

8. The method of claim 6, wherein determining the next command occurs before a seek operation associated with the previous command is completed.

9. The method of claim 6, wherein storing the location associated with the next command in the position queue overwrites a location associated with the previous command in the position queue.

10. The method of claim 6, wherein storing the location associated with the next command in the position queue occurs in response to a seek operation associated with the previous command being completed.

11. The method of claim 6, wherein performing the seek operation begins before the previous command is completed.

12. The method of claim 6, wherein performing the seek operation begins before a command complete operation associated with the previous command is completed.

13. The method of claim 6, including processing background functions associated with the next command before the previous command is completed.

14. The method of claim 6, including processing background functions associated with the next command concurrently with storing the location associated with the next command in the position queue.

15. The method of claim 6, wherein the commands are read and write commands.

16. A method of processing commands in a disk drive, comprising:
- the disk drive receiving commands from a host computer system;
- the disk drive storing the commands in a command queue;
- the disk drive determining a next command to process from the command queue by reordering the commands to improve performance of the disk drive;
- the disk drive storing a location associated with the next command in a one-deep position queue before a previous command is completed, thereby overwriting a location associated with the previous command in the position queue; and
- the disk drive performing a seek operation in response to the location stored in the position queue.

17. The method of claim 16, wherein determining the next command occurs before a seek operation associated with the previous command is completed.

18. The method of claim 16, wherein storing the location associated with the next command in the position queue occurs in response to a seek operation associated with the previous command being completed.

19. The method of claim 16, wherein performing the seek operation begins before the previous command is completed.

20. The method of claim 16, wherein the commands are read and write commands.

21. In a disk drive wherein read and write commands are accessed by a read/write head, a method of processing the commands comprising:
- the disk drive receiving commands from a host computer system;
- the disk drive storing the commands in a command queue;
- the disk drive determining a next command in the command queue to process;
- the disk drive determining a location associated with the next command;
- the disk drive storing the location associated with the next command in a position queue;
- the disk drive updating the position queue after each next command is determined; and
- the disk drive positioning a read/write head to the location of the next command while determining a subsequent command in the command queue to process following the next command, wherein the subsequent command following the next command is determined before completion of positioning the read/write head to the location associated with the next command.

22. The method of claim 21, wherein a seek request is initiated as soon as the location associated with the next command is determined.

23. The method of claim 21, wherein the position queue is a one-deep position queue.

24. The method of claim 21, wherein the disk drive is a magnetic disk drive.

25. The method of claim 21, wherein the disk drive is an optical storage device.

26. A method of processing commands in a disk drive, comprising:
- the disk drive receiving commands from a host computer system;
- the disk drive storing the commands in a command queue;
- the disk drive determining a next command to process from the command queue;
- the disk drive storing a location associated with the next command in a position queue before a previous command is completed; and
- the disk drive performing a seek operation in response to the location stored in the position queue.

27. The method of claim 26, wherein determining the next command includes reordering the command queue.

28. The method of claim 26, wherein determining the next command occurs before a seek operation associated with the previous command is completed.

29. The method of claim 26, wherein storing the location associated with the next command in the position queue overwrites a location associated with the previous command in the position queue.

30. The method of claim 26, wherein storing the location associated with the next command in the position queue occurs in response to a seek operation associated with the previous command being completed.

31. The method of claim 26, wherein performing the seek operation begins before the previous command is completed.

32. The method of claim 26, wherein performing the seek operation begins before a command complete operation associated with the previous command is completed.

33. The method of claim 26, including positioning a read/write head towards the location associated with the next command concurrently with setting up circuitry in the disk drive to process background functions associated with the next command before the previous command is completed.

34. The method of claim 26, including positioning a read/write head towards the location associated with the next command concurrently with setting up circuitry in the disk drive so that background functions associated with the next command are completed by the time the read/write head arrives at the location.

35. The method of claim 26, wherein the commands are read and write commands.

36. A method of processing commands in a disk drive, comprising:

the disk drive receiving commands from a host computer system;

the disk drive storing the commands in a command queue;

the disk drive determining a next command to process from the command queue by reordering the commands to improve performance of the disk drive;

the disk drive storing a location associated with the next command in a position queue before a previous command is completed, thereby overwriting a location associated with the previous command in the position queue; and the disk drive performing a seek operation in response to the location stored in the position queue.

37. The method of claim 36, wherein determining the next command occurs before a seek operation associated with the previous command is completed.

38. The method of claim 36, wherein storing the location associated with the next command in the position queue occurs in response to a seek operation associated with the previous command being completed.

39. The method of claim 36, wherein performing the seek operation begins before the previous command is completed.

40. The method of claim 36, wherein the commands are read and write commands.

* * * * *